(12) United States Patent
Swearingen et al.

(10) Patent No.: US 9,789,973 B2
(45) Date of Patent: Oct. 17, 2017

(54) POWER INTERRUPTION BRIDGE CIRCUIT

(75) Inventors: Paul Swearingen, Rockford, IL (US);
Robert L. Seagren, Rockford, IL (US);
Joshua Berg, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 958 days.

(21) Appl. No.: 13/440,060

(22) Filed: Apr. 5, 2012

(65) Prior Publication Data

US 2013/0264878 A1 Oct. 10, 2013

(51) Int. Cl.
*H02J 9/08* (2006.01)
*H02J 9/06* (2006.01)
*B64D 41/00* (2006.01)

(52) U.S. Cl.
CPC ............ *B64D 41/007* (2013.01); *H02J 9/062* (2013.01); *B64D 2221/00* (2013.01); *Y10T 307/62* (2015.04); *Y10T 307/625* (2015.04)

(58) Field of Classification Search
CPC .... B64D 2221/00; B64D 41/007; H02J 9/062
USPC .......................................................... 307/65
See application file for complete search history.

(56) References Cited

U.S. PATENT DOCUMENTS

| | | | | |
|---|---|---|---|---|
| 5,808,376 | A * | 9/1998 | Gordon | G01T 1/175 307/64 |
| 7,689,852 | B2 * | 3/2010 | Hwang | G06F 1/28 713/300 |
| 2001/0024065 | A1 * | 9/2001 | McAndrews | 307/66 |
| 2002/0047634 | A1 * | 4/2002 | Ito et al. | 315/291 |
| 2003/0030954 | A1 * | 2/2003 | Bax | H01H 83/226 361/87 |
| 2003/0066759 | A1 * | 4/2003 | Hardee | C25C 7/00 205/565 |
| 2004/0246752 | A1 * | 12/2004 | Chian | H02M 3/1584 363/60 |
| 2005/0099160 | A1 * | 5/2005 | Asaumi | H02J 7/0019 320/132 |
| 2006/0061213 | A1 | 3/2006 | Michalko | |
| 2007/0007824 | A1 * | 1/2007 | Chen | H02J 9/061 307/66 |
| 2007/0097569 | A1 * | 5/2007 | Huang | H02M 1/32 361/56 |
| 2008/0155294 | A1 * | 6/2008 | Kikuchi | G06F 1/305 713/340 |
| 2010/0102625 | A1 * | 4/2010 | Karimi | B60L 1/00 307/9.1 |

(Continued)

OTHER PUBLICATIONS

The extended European Search Report in counterpart European Application No. 13153421.6 filed Jan. 15, 2013.

*Primary Examiner* — Jared Fureman
*Assistant Examiner* — Emmanuel R Dominique
(74) *Attorney, Agent, or Firm* — Kinney & Lange, P. A.

(57) ABSTRACT

A controller is employed in conjunction with an electrical power distribution system (EPDS). The controller includes at least a first input for receiving DC power from a DC power bus and a power supply circuit connected to the first input to provide operational power to the controller. The controller further includes a power interrupt bridge circuit that monitors the voltage provided of the first input. In response to the monitored voltage being less than a threshold value, the power interrupt bridge circuit supplies power to the power supply circuit from a DC emergency source for a defined time period.

16 Claims, 3 Drawing Sheets

(56) References Cited

U.S. PATENT DOCUMENTS

| | | | | |
|---|---|---|---|---|
| 2012/0013177 | A1* | 1/2012 | Krenz | H02J 4/00 307/9.1 |
| 2012/0013186 | A1* | 1/2012 | Sarti | G06F 1/30 307/23 |
| 2012/0068531 | A1* | 3/2012 | Abida | B60L 11/12 307/9.1 |
| 2012/0232728 | A1* | 9/2012 | Karimi | H02J 3/38 701/22 |
| 2012/0318914 | A1* | 12/2012 | Rajashekara | B64D 41/00 244/58 |
| 2013/0181448 | A1* | 7/2013 | Larson | B60L 8/006 290/43 |

\* cited by examiner

POWER INTERRUPTION BRIDGE CIRCUIT

BACKGROUND

The present invention is related to power distribution systems and in particular to controllers employed in conjunction with power distribution systems.

Aircraft applications rely on electrical power distribution systems to power a variety of critical systems on the aircraft. Controllers, such as bus power control units (BPCUs) and emergency power controllers (EMPCs), are responsible for monitoring and controlling the operation of the electrical power distribution system. For example, a BPCU is responsible for monitoring operation of the power distribution system and providing commands to selectively control the operation of various relays and/or contactors to selectively route power through various buses. Similarly, an EMPC is responsible for monitoring and providing command instructions to relays and/or contactors within the emergency power system to selectively route power to desired buses. In addition, the EMPC may also be responsible for deploying an RAM Air Turbine (RAT) generator for the purpose of generating emergency power.

Both the BPCUs and the EMPCs require power to operation, typically derived from one or more of the power buses the units are charged with monitoring and controlling. A loss of power on all of the power buses results in an undesirable loss of operational power in the BPCUs and EMPCs.

SUMMARY

A controller is employed in conjunction with an electrical power distribution system (EPDS). The controller includes at least a first input for receiving DC power from a DC power bus and a power supply circuit connected to the first input to provide operational power to the controller. The controller further includes a power interrupt bridge circuit that monitors the voltage provided of the first input. In response to the monitored voltage being less than a threshold value, the power interrupt bridge circuit supplies power to the power supply circuit from a DC emergency source for a defined time period.

DETAILED DESCRIPTION

The present invention is directed to a controller, such as a bus power control unit (BPCU) and/or emergency power controller (EMPC). The controller includes a power interrupt bridge circuit that monitors voltage on a DC bus that provides operational power to the controller, and compares the monitored DC voltage to a threshold. If the monitored DC voltage decreases below a threshold value, then the power interrupt bridge circuit supplies power to a DC output from an emergency DC power source for a defined period of time. In this way, the controller remains powered even during a loss of "normal" power.

Figure 1B:
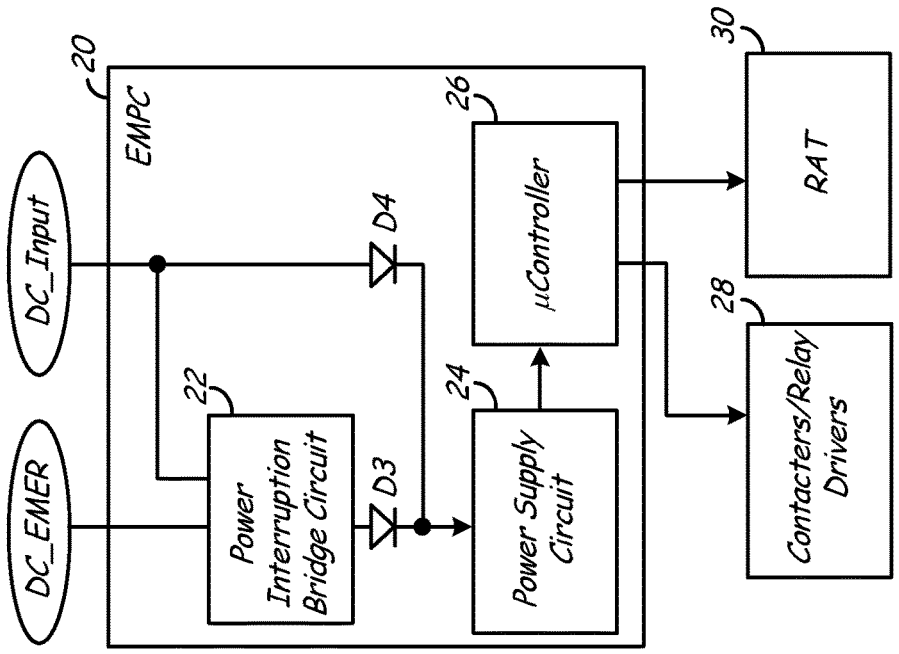
FIGS. 1A and 1B are circuit diagrams of a bus power control unit (BPCU) and emergency power controller (EMPC), respectively, according to an embodiment of the present invention.
Figure 1A:
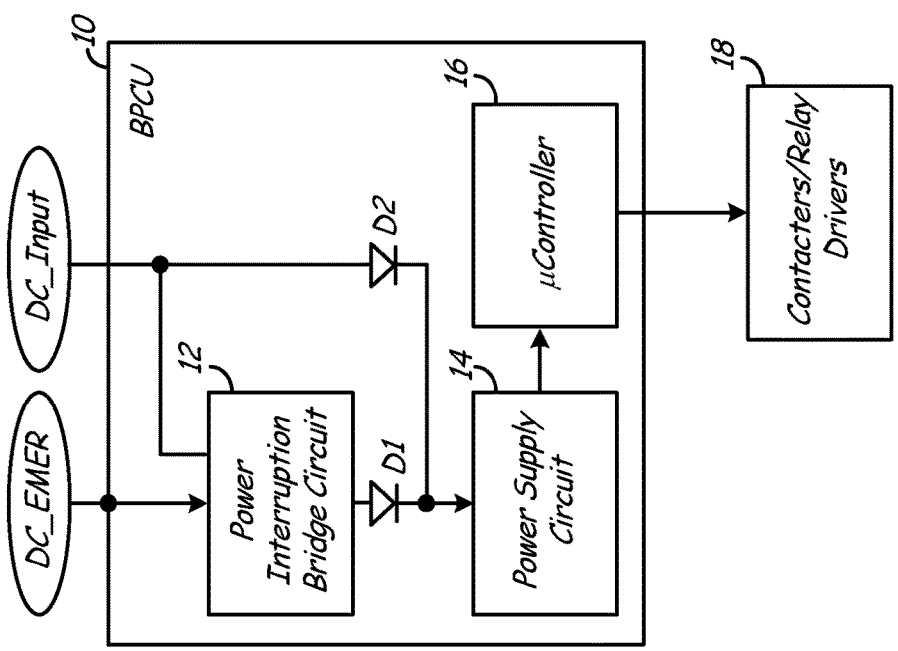

FIGS. 1A and 1B are circuit diagrams of a bus power control unit (BPCU) and emergency power controller (EMPC), respectively, employed as part of an electrical power distribution system (EPDS) according to an embodiment of the present invention.

FIG. 1A illustrates BPCU 10 connected to receive "normal" operating power from DC power bus DC_Input, and emergency power from DC emergency bus DC_EMER. BPCU 10 includes power interruption bridge circuit 12, diodes D1 and D2, power supply circuit 14, and micro-controller 16. During normal operation, power supplied by DC power bus DC_Input is provided via diode D2 to power supply circuit 14, which supplies operational power to micro-controller 16. In other embodiments, BPCU may receive power from a plurality of DC power buses, each of which is provided via a separate diode (creating a diode OR circuit) to power supply circuit 14.

Power interruption bridge circuit 12 monitors the voltage provided by DC power bus DC_Input. In the event the monitored voltage falls below a threshold level, power interruption bridge circuit 12 operates to supply power from DC emergency bus DC_EMER through diode D1 to power supply circuit 14 for a defined period of time. In one embodiment, power derived from the DC emergency bus DC_EMER is provided via one or more packs of batteries, referred to as a battery-direct bus. In other embodiments, DC emergency bus DC_EMER may derive power from other emergency power sources. Typically, emergency power sources are only capable of providing a limited amount of power for a limited amount of time.

In this way, despite a loss of power supplied by DC power bus DC_Input, power supply circuit 14 remains powered for a defined period of time based on power supplied by power interruption bridge circuit. At the end of the defined period of time, power interruption bridge circuit prevents power from being supplied by DC emergency bus DC_EMER to power supply circuit 14 to prevent depletion of the DC emergency bus source (e.g., batteries). During the time that emergency power is supplied by power interruption bridge circuit to power supply circuit 14, BPCU remains operational and can transition the power distribution system from a normal operating mode to a "safe" or "emergency" operating mode. In particular, microcontroller 16 generates commands/instructions provided to contractors and/or relay drivers 18 to transition the power distribution system to the desired safe operating mode. This may include disconnecting non-essential buses and/or loads, and connecting essential buses and/or loads to emergency power sources such as a RAM Air Turbine (RAT) generator. In one embodiment, the defined period of time power interruption bridge circuit supplies power to power supply circuit 14 is defined to ensure micro-controller has sufficient time to generate the commands/instructions necessary to transition the power distribution system to the desired safe operating mode or emergency operating mode.

FIG. 1B illustrates another type of controller, emergency power controller 20, in which the power interruption bridge circuit may be utilized. In the embodiment shown in FIG. 1B, EMPC 20 is connected to receive "normal" operating power from DC power bus DC_Input, and emergency power from DC emergency bus DC_EMER. EMPC 20 includes power interruption bridge circuit 22, diodes D3 and D4, power supply circuit 24, and micro-controller 26. During normal operation, power supplied by DC power bus DC_Input is provided via diode D4 to power supply circuit 24, which supplies operational power to micro-controller 26. In other embodiments, EMPC 20 may receive power from a plurality of DC power buses, each of which is provided via a separate diode (creating a diode OR circuit) to power supply circuit 24.

Power interruption bridge circuit 22 monitors the voltage provided by DC power bus DC_Input. In the event the monitored voltage falls below a threshold level, power interruption bridge circuit 22 operates to supply power from DC emergency bus DC_EMER through diode D3 to power supply circuit 24 for a defined period of time. In one embodiment, power derived from the DC emergency bus DC_EMER is provided via one or more packs of batteries, referred to as a battery-direct bus. In other embodiments, DC emergency bus DC_EMER may derive power from other emergency power sources capable of providing power for limited periods of time (e.g., fuel cells, capacitors, super capacitors, etc.). Typically, emergency power sources are only capable of providing a limited amount of power for a limited amount of time.

In this way, despite a loss of power supplied by DC power bus DC_Input, power supply circuit 24 remains powered for a defined period of time based on power supplied by power interruption bridge circuit. At the end of the defined period of time, power interruption bridge circuit 22 prevents power from being supplied by DC emergency bus DC_EMER to power supply circuit 24 to prevent depletion of the DC emergency bus source (e.g., batteries). During the time that emergency power is supplied by power interruption bridge circuit 22 to power supply circuit 24, EMPC 20 remains operational and can transition the power distribution system from a normal operating mode to a "safe" or "emergency" operating mode. As described with respect to FIG. 1A, this may include generating commands/instructions provided to contractors and/or relay drivers 28 to transition the power distribution system to the desired safe operating mode. This may include disconnecting non-essential buses and/or loads, and connecting essential buses and/or loads to emergency power sources such as a RAM Air Turbine (RAT) generator.

In addition, in one embodiment EMPC 20 is responsible for deploying RAM Air Turbine (RAT) generator 30 in response to an emergency loss of power. The defined period of time power interruption bridge circuit 22 maintains power to power supply circuit 24 is selected, in part, to ensure micro-controller 26 has sufficient time to deploy RAT 30. The defined period of time may also be selected based on time required to send command/instructions to contactors/relay drivers 28.

Figure 2:
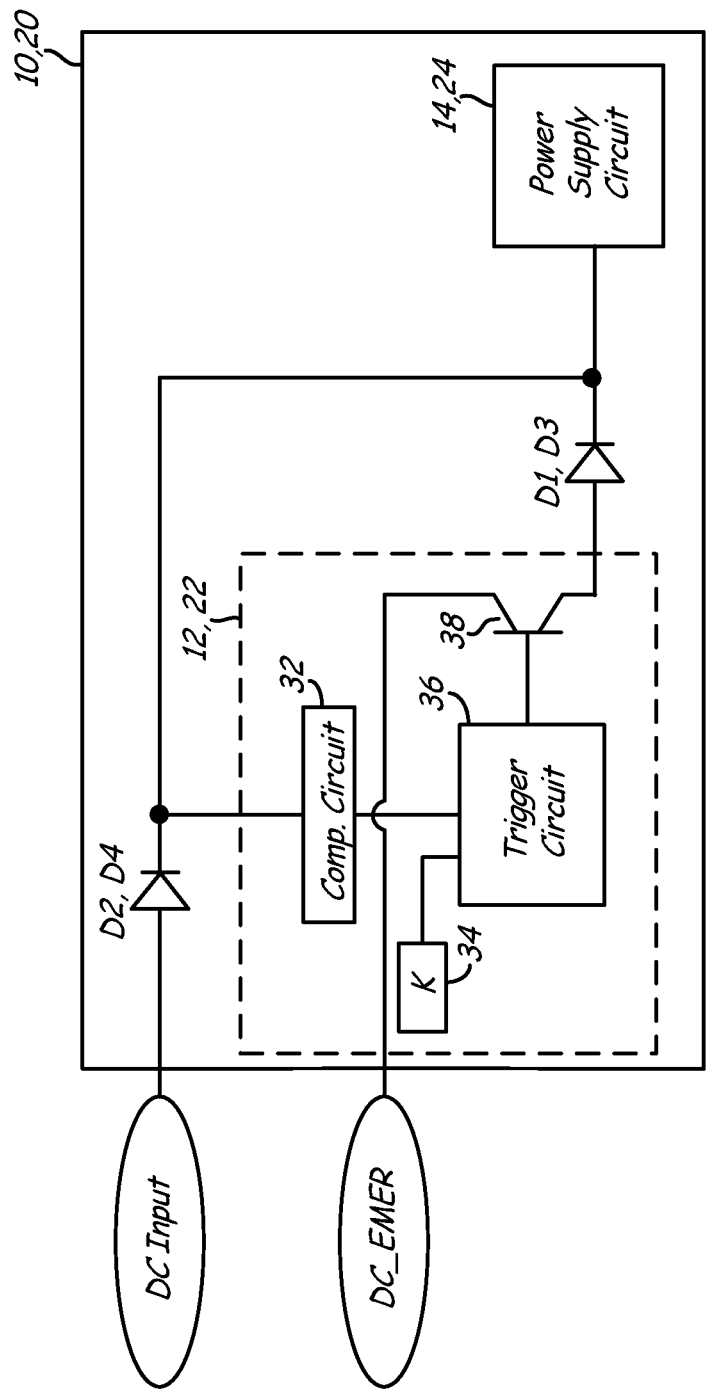
FIG. 2 is a circuit diagram of the BPCU and/or the EMPC according to an embodiment of the present invention.

FIG. 2 is a circuit diagram of BPCU 10 and/or EMPC 20 (referred to generically as "controller 10, 20") according to an embodiment of the present invention. Circuit elements previously described with respect to FIGS. 1A and 1B are described here with reference to both reference numbers. For example, diode D2 (shown in FIG. 1A) and diode D4 (shown in FIG. 1B) is referred to here as diode D2, D4. Likewise, diode D1 (shown in FIG. 1A) and diode D3 (shown in FIG. 1B) is represented as diode D1, D3, power interruption bridge circuit 12 (shown in FIG. 1A) and power interruption bridge circuit 22 (shown in FIG. 1B) is represented as power interruption bridge circuit 12, 22, and power supply circuit 14 (shown in FIG. 1A), power supply circuit 24 (shown in FIG. 1B) is represented as power supply circuit 14, 24.

In particular, FIG. 2 illustrates in additional detail the operation of power interruption bridge circuit 12, 22, which includes voltage monitoring/comparator 32, time constant selector 34, trigger circuit 36, and power switch 38. As described with respect to FIGS. 1A and 1B, controller 10, 20 receives "normal" operational power from DC power bus DC_Input. Additionally, controller 10, 20 is connected to receive DC power from an emergency DC bus DC_EMER.

Voltage monitoring/comparator circuit 32 monitors the voltage provided by DC bus DC_Input to detect low voltage conditions indicative of a potential fault. If the monitored voltage falls below the threshold value associated with or programmed into voltage monitoring/comparator circuit 32, a trigger signal is provided to the input of trigger circuit 36. In response, trigger circuit 36 turns ON power switch 38, creating a circuit path from the DC emergency bus DC_EMER through diode D1, D3 to power supply circuit 14, 24. In this way, controller 10, 20 remains powered despite the potential loss of power associated with DC power bus DC_Input.

The duration of time trigger circuit 36 maintains power switch 38 in the On state is determined based on the value k stored by time constant selector 34, which is selected based on the particular application. In general, the time value stored by time circuit 64 is selected to ensure that controller 10 remains powered for a duration of time sufficient to allow controller to provide emergency commands/instructions to the power distribution system, without fully depleting the power source associated with DC emergency bus DC_EMER. For example, if controller 10, 20 is an emergency power controller (EMPC) (as shown in FIG. 1B), the time constant k is selected to ensure controller 10, 20 receives operational power long enough to deploy RAT 30 (shown in FIG. 1B).

At the expiration of the defined time period determined by the stored value k, trigger circuit 36 turns power switch 38 Off, thereby disconnecting the DC emergency bus DC_EMER from supplying power to power supply circuit 14, 24. In one embodiment, the expiration of the defined time period results in controller 10, 20 remaining unpowered until "normal" power sources are restored. In other embodiments, the time period is defined such that at the end of the defined time period, emergency power such as that provided by RAT 30 (shown in FIG. 1B) provides operational power to controller 10, 20.

Figure 3:
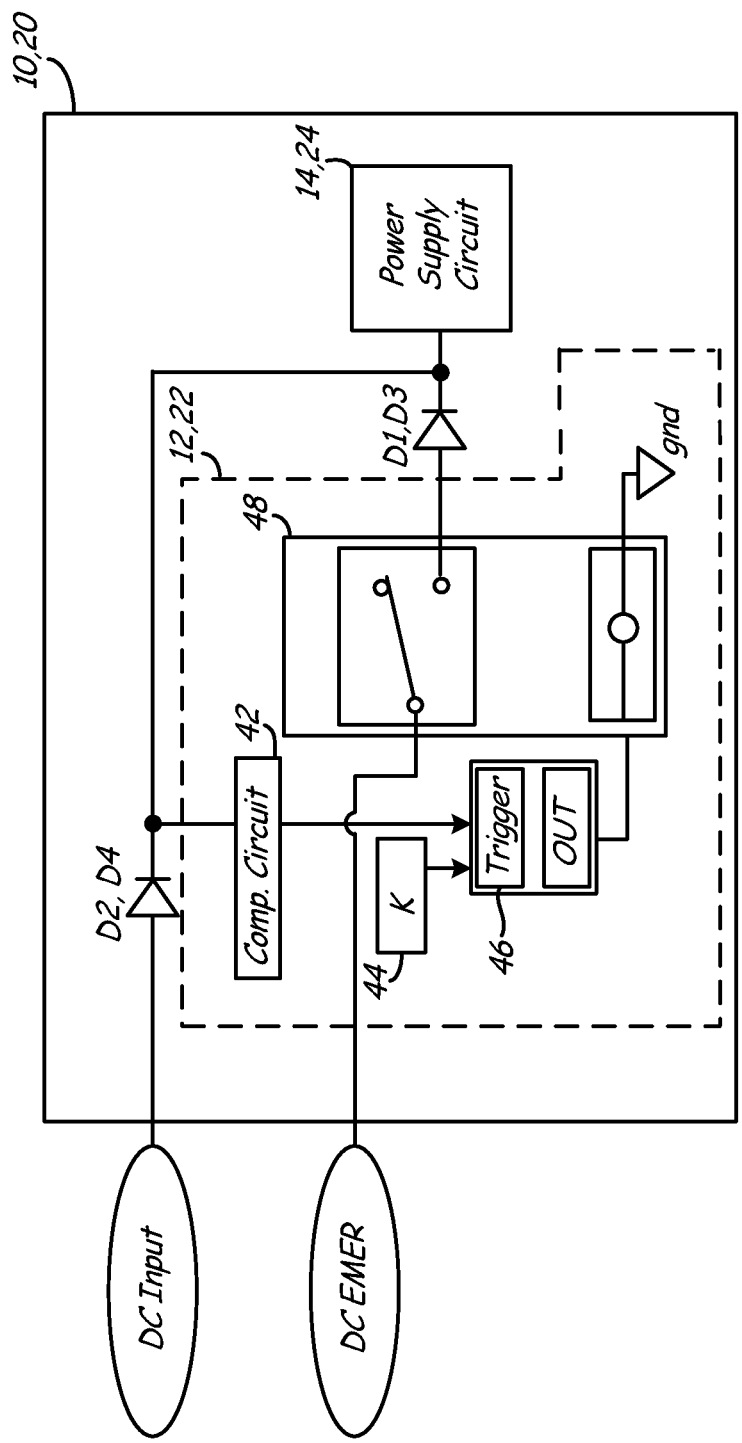
FIG. 3 is a circuit diagram of the BPCU and/or the EMPC according to an embodiment of the present invention.

FIG. 3 is a circuit diagram of another embodiment of BPCU 10 and/or EMPC 20 (referred to generically as "controller 10, 20"). Once again, circuit elements previously described with respect to FIGS. 1A and 1B are described here with reference to both reference numbers. For example, diode D2 (shown in FIG. 1A) and diode D4 (shown in FIG. 1B) is referred to here as diode D2, D4. Likewise, diode D1 (shown in FIG. 1A) and diode D3 (shown in FIG. 1B) is represented as diode D1, D3, power interruption bridge circuit 12 (shown in FIG. 1A) and power interruption bridge circuit 22 (shown in FIG. 1B) is represented as power interruption bridge circuit 12, 22, and power supply circuit 14 (shown in FIG. 1A), power supply circuit 24 (shown in FIG. 1B) is represented as power supply circuit 14, 24.

In particular, FIG. 3 illustrates in additional detail the operation of power interruption bridge circuit 12, 22, which includes voltage monitoring/comparator 42, time constant selector 44, trigger circuit 46, and relay 48. As described with respect to FIGS. 1A and 1B, controller 10, 20 receives "normal" operational power from DC power bus DC_Input. Additionally, controller 10, 20 is connected to receive DC power from an emergency DC bus DC_EMER.

The operation of voltage monitoring/comparator circuit 42, time constant selector 44, and trigger circuit 46 operate in the same was as discussed with respect to FIG. 2. However, power switch 38 (shown in FIG. 2) has been replaced with relay 48.

Once again, voltage monitoring/comparator 42 monitors the voltage provided by DC power bus DC_Input to a threshold. If the monitored voltage falls below the threshold value associated with or programmed into voltage monitoring/comparator circuit 42, a trigger signal is provided to the input of trigger circuit 46. In response, trigger circuit 36 creates a circuit path from DC power bus DC_Input through trigger circuit 46 and relay 48 to ground. The resulting circuit path energizes relay 48, creating a circuit path between DC emergency bus DC_EMER and power supply circuit 14, 24. In this way, controller 10, 20 remains powered despite the potential loss of power associated with DC power bus DC_Input.

The duration of time trigger circuit 46 maintains power switch 38 in the On state is determined based on the value k stored by time constant selector 44, which is selected based on the particular application. As discussed above with respect to FIG. 2, the time value k stored by time constant selector 44 is selected to ensure that controller 10, 20 remains powered for a duration of time sufficient to allow controller to provide emergency commands/instructions to the power distribution system, without fully depleting the power source associated with DC emergency bus DC_EMER.

At the expiration of the defined time period determined by the stored value k, trigger circuit 46 turns Off, thereby de-energizing relay 48 and disconnecting DC emergency power DC_EMER from supplying power to power supply circuit 14, 24. As discussed above with respect to FIG. 2, the duration of the time period is selected based on the application to allow controller 10, 20 to remain operational long enough to configure the system for emergency operation and/or deploy emergency power systems (e.g., RAT).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A controller for providing control commands associated with at least one of an alternating current (AC) power bus and a direct current (DC) power bus, the controller comprising:
    at least a first input for receiving DC power from a DC power bus;
    a power supply circuit connected to the first input to receive DC power that is used to power the controller; and
    a power interrupt bridge circuit connected to monitor a voltage provided by the DC power bus and in response to the monitored voltage being less than a threshold value supplies power to the power supply circuit from a DC emergency source for only a defined time period to ensure the controller remains powered and prevents power from being supplied from the DC emergency source to the controller after the end of the defined time period, wherein the power interrupt bridge circuit includes:
        a time constant selector that stores a time value, wherein the time value equals a duration of the defined time period;
    wherein the controller is employed in conjunction with a RAM air turbine (RAT) and provides deployment instructions to the RAT, wherein the defined time period is greater than a time required to deploy the RAT in response to a detected loss of power.

2. The controller of claim 1, wherein the power interrupt bridge circuit further includes:
    a monitoring/comparator circuit that monitors the voltage provided by the DC power bus and provides a trigger signal when the monitored voltage is less than a threshold value;
    a relay circuit having a first state and a second state, wherein the relay circuit connects the DC emergency source to the power supply circuit in the first state and prevents connection of the DC emergency source to the power supply circuit in the second state; and
    a trigger circuit connected to place the relay circuit in the first state in response to the trigger signal provided by the monitoring/comparator circuit and place the relay circuit in the second state at the expiration of the defined time period.

3. The controller of claim 1, wherein the power interrupt bridge circuit further includes:
    a monitoring/comparator circuit that monitors the voltage provided by the DC power bus and provides a trigger signal when the monitored voltage is less than a threshold value;
    a solid-state switch having a first state and a second state, wherein the solid-state switch connects the DC emergency source to the power supply circuit in the first state and prevents connection of the DC emergency source to the power supply circuit in the second state; and
    a trigger circuit connected to place the solid-state switch in the first state in response to the trigger signal provided by the monitoring/comparator circuit and place the solid-state switch in the second state at the expiration of the defined time period.

4. The controller of claim 1, wherein the defined time period is less than a time required to deplete the DC emergency power source.

5. The controller of claim 1, wherein the DC emergency power source is selected from a group consisting of at least one of the following: a battery, a capacitor, and a fuel cell.

6. The controller of claim 1, wherein the controller is a bus power control unit (BPCU) that provides commands to one or more relays and/or contactors.

7. A power distribution system comprising:
    a direct current (DC) power bus;
    an emergency DC power bus;
    a RAM air turbine (RAT) generator that is deployed to generate emergency power;
    a controller that receives operating power from the DC power bus, the controller including a power interrupt bridge circuit that monitors a voltage of the DC power bus and in response to the monitored voltage decreasing below a threshold level supplies operating power to the controller from the emergency DC power bus for a defined time period and prevents operating power from being supplied from the emergency DC power bus to the controller after the end of the defined time period, wherein the power interrupt bridge circuit includes:

a time constant selector that stores a time value, wherein the time value equals a duration of the defined time period;

wherein the controller provides deployment instructions to the RAT, wherein the defined time period is greater than a time required to deploy the RAT in response to a detected loss of power.

8. The power distribution system of claim 7, wherein the power interrupt bridge circuit further includes:
   a monitoring/comparator circuit that monitors the voltage provided by the DC essential bus and provides a trigger signal when the monitored voltage is less than a threshold value;
   a relay circuit having a first state and a second state, wherein the relay circuit connects the DC emergency source to supply operating power to the controller in the first state and prevents connection of the DC emergency source to the DC power supply circuit in the second state; and
   a trigger circuit connected to place the relay circuit in the first state in response to the trigger signal provided by the monitoring/comparator circuit and in the second state at the expiration of the defined time period.

9. The power distribution system of claim 7, wherein the power interrupt bridge circuit further includes:
   a monitoring/comparator circuit that monitors the voltage provided by the DC power bus and provides a trigger signal when the monitored voltage is less than a threshold value;
   a solid-state switch having a first state and a second state, wherein the solid-state switch connects the DC emergency source to the power supply circuit in the first state and prevents connection of the DC emergency source to the power supply circuit in the second state; and
   a trigger circuit connected to place the solid-state switch in the first state in response to the trigger signal provided by the monitoring/comparator circuit and place the solid-state switch in the second state at the expiration of the defined time period.

10. The power distribution system of claim 7, wherein the defined time period is greater than a time required to deploy the RAT in response to a detected loss of power.

11. The power distribution system of claim 7, wherein the defined time period is less than a time required to deplete the DC emergency power source.

12. The power distribution system of claim 7, wherein the DC emergency power source is selected from a group consisting of at least one of the following: a battery, a capacitor, and a fuel cell.

13. A method of supplying power to a controller during emergency operations, the method comprising:
   monitoring a voltage associated with operational power provided to the controller;
   comparing the monitored voltage to a threshold value to detect a low voltage condition;
   connecting an emergency DC power supply to supply operational power to the controller in response to the monitored voltage being less than the threshold value; and
   disconnecting the emergency DC power supply from the controller upon expiration of a defined time period, wherein a duration of the defined time period equals a time value stored in a time constant selector of a power interrupt bridge circuit;
   wherein the controller utilizes power received from the emergency DC power supply to deploy a RAM air turbine (RAT) generator for generating emergency power.

14. The method of claim 13, wherein the defined time period is greater than a time required by the controller to deploy the RAT in response to a detected loss of power.

15. The method of claim 13, wherein the defined time period is less than a time required to deplete the emergency DC power supply.

16. The method of claim 13, wherein the controller is a bus power control unit (BPCU), wherein the BPCU utilizes power received from the emergency DC power supply to configure relays and/or contactors associated with a power distribution system to a desired state for emergency operation.

* * * * *